ically outwardly protrud-
United States Patent
Rode

[11] 3,774,896
[45] Nov. 27, 1973

[54] DUAL RATE CYLINDRICAL SPRING
[75] Inventor: John E. Rode, Fonda, N.Y.
[73] Assignee: Temper Corporation, Fonda, N.Y.
[22] Filed: Feb. 16, 1972
[21] Appl. No.: 226,731

[52] U.S. Cl................. 267/182, 267/161, 267/162, 267/167
[51] Int. Cl............................ F16f 1/32, F16f 1/34, F16j 3/00
[58] Field of Search.................. 267/142, 144, 161, 267/166, 167, 182, 162; 29/455

[56] References Cited
UNITED STATES PATENTS
2,534,123  12/1950  Hasselhorn..................... 267/162 X

*Primary Examiner*—Gerald M. Forlenza
*Assistant Examiner*—Howard Beltran
*Attorney*—Melvin A. Crosby

[57] ABSTRACT

A dual rate cylindrical spring and load arrangement in which a convoluted tubular member has generally radial flanges at the end with axially outwardly protruding shoulders spaced radially from the median plane of the convoluted portion of the member. When axially compressed, the end flanges flex inwardly under elastic conditions until the parts confining the member engage the ends of the axially outermost convolutions. After a first further period of elastic deformation, the member will commence to undergo plastic deformation in the convoluted portion thereof and maintain substantially constant load characteristics.

4 Claims, 7 Drawing Figures

3,774,896

DUAL RATE CYLINDRICAL SPRING

This invention relates to load or compression springs, and is particularly concerned with a dual rate load or compression spring, which maintains the same load characteristics over a substantial range of axial compression thereof.

Load springs, or compression springs, for preloading parts are, of course, known, but it is difficult to provide an arrangement wherein a predetermined substantially constant preload can be reliably developed on a part to be preloaded and maintained over a rather wide range of tolerances of the parts within which the member to be preloaded is contained.

For example, with a bearing to be preloaded, there is usually a housing in which the bearing is mounted and a bearing cap mounted on the housing and any preloading of the bearing is accomplished by the force developed on a race of the bearing by the bearing cap.

It has been attempted to establish predetermined preload conditions by accurately machining such members and by introducing shims between the bearing cap and the housing, but in the first instance, high accurate machining procedures are necessary, with little room for tolerance, and in the second case, laborious hand fitting is required and which is often accomplished by human error.

With the foregoing in mind, the primary object of the present invention is the provision of a load or compression spring, especially for loading parts of the nature referred to in which a reliable preload is readily accomplished in a simple manner and without maintaining close machining tolerances.

Another object of the present invention is the provision of a load ring having a dual spring rate.

Still another object of the present invention is the provision of a load ring having a dual spring rate during the initial portion of the compression of the ring and having substantially constant load characteristics thereafter.

It is also an object of the present invention to provide a load ring of the nature referred to which is inexpensive to manufacture.

The foregoing objects as well as still other objects and advantages of the present invention will become more apparent upon reference to the following detailed specification taken in connection with the accompanying drawings in which.

BRIEF SUMMARY OF THE INVENTION

According to the present invention, a variable elastic spring rate is imparted to an axially compressible compression spring or load spring by forming the ring with a body portion convoluted in cross section and with the end faces thereof provided with an offset. The said end faces exhibit one spring rate while the convoluted body portion of the ring between the end faces exhibits another spring rate and also undergoes plastic deformation during axial compression of the ring.

DETAILED DESCRIPTION OF THE INVENTION

Figure 1:
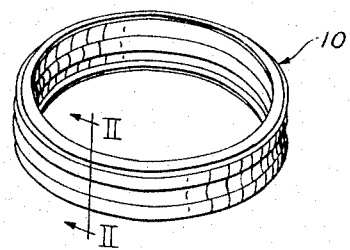
FIG. 1 is a schematic perspective view of a spring element or load ring according to the present invention.

Referring to the drawings somewhat more in detail, FIG. 1 shows a typical ring according to the present invention at 10 and which ring may be an annular member with the ends joined or it may be an annular member with the ends free of each other and it may, furthermore, consist of more than one convolution with the free ends of the strip from which member 10 is formed in overlapping relation.

In any case, the ring 10 is formed of a strip of metal characterized in work hardening when it is stressed beyond the elastic limit and with the strip being convoluted in the axial direction of the ring.

Figure 2:
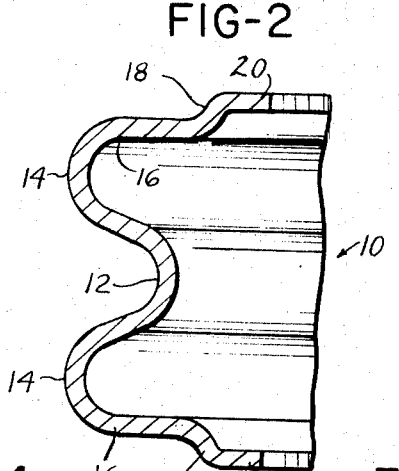
FIG. 2 is a vertical section through one side of the ring indicated by line II—II on FIG. 1 and drawn at enlarged scale.

FIG. 2 shows a typical cross section through a strip of metal from which the ring is formed, and it will be seen to comprise a plurality of convolutions in end to end relation in the axial direction. In the modification of FIG. 2, the central convolution 12 is concave radially outwardly and adjacent thereto are end convolutions which are concave radially inwardly.

The specific number of convolutions in the ring is subject to variation and, likewise, the end convolutions can be concave radially inwardly or radially outwardly according to individual preferences. Convolution 12 and the connection thereof with end convolutions 14 is advantageously somewhat curvilinear while extending from the curved outer ends of both of the end convolutions 14 are substantially straight leg portions 16. Each leg portion 16 has an offset 18 extending axially outwardly therefrom and from the axially outer end of each offset there is a radial flange 20.

This configuration of the strip is rolled into the strip by forming rolls and, thereafter, the ring may be stress relieved by annealing, and may be hardened to a desired degree by heat treatment.

Figure 3:
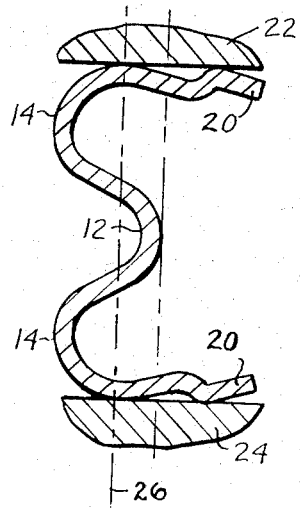
FIG. 3 is a view showing the ring partly compressed.

The ring is shown in unstressed condition in FIG. 2 while in FIG. 3 the ring is shown disposed between parts 22 and 24 and which have been drawn together to the point that legs 16 and flanges 20 are bent inwardly and the parts 22 and 24 engage the convoluted body of the ring on a line indicated at 26 and which is so disposed that further movement of the parts 22 and 24 toward each other will bring about axial compression of the body of the ring.

At this point, the portions of the ring lying toward the right of line 26 in FIG. 3 are not stressed beyond the elastic limit, but the flexing of radial flange 20 and that portion of leg 16 to the right of line 26 is in the form of elastic deformation at a predetermined spring rate.

Figure 4:
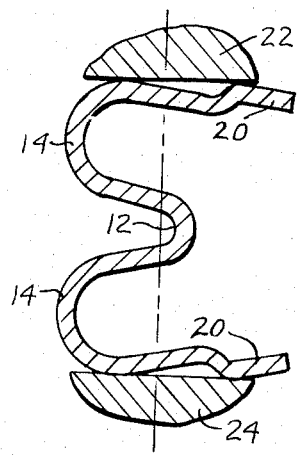
FIG. 4 shows the ring more fully compressed.

Further movement of parts 22 and 24 toward each other, as shown in FIG. 4, will bring about axial compression of the body portion of the ring consisting of that part thereof lying between those points of the ring which contact parts 22 and 24 where they are intersected by line 26. This portion of the ring will first undergo elastic deformation at a second spring rate until some annular part of the ring is stressed beyond the elastic limit, whereupon this portion of the ring becomes permanently deformed and will, also, work harden.

Further, movement of parts 22 and 24 toward each other will cause further compression of the ring and further plastic deformation and work hardening thereof until the ring is substantially fully collapsed. The releasing of the ring at any time will result in a certain spring back thereof consisting of the portion of the compression of the ring due to elastic deformation thereof.

Thus, the body of the ring will spring back a certain amount, while the radial flanges 20 and that portion of legs 16 to the right of ine 26 will spring back substantially to the original position thereof.

Figure 5:
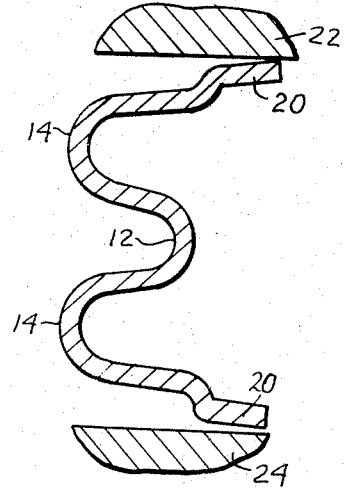
FIG. 5 shows the manner in which the ring partially springs back from its FIG. 4 position when unloaded.

The springing back of the ring from the compressed condition of FIG. 4 is shown in FIG. 5.

Figure 6:
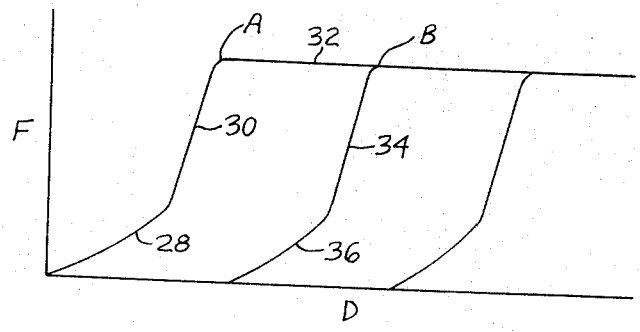
FIG. 6 is a graph showing a typical load-deflection curve for a spring according to the present invention.

Turning to FIG. 6, a graph is shown in which the ordinate, F, is the force required to compress the ring with the amount of axial compression of the ring being indicated by the abscissa, D.

Taking the ring in its FIG. 2 condition and compressing it to the FIG. 3 condition, the elastic compression required to bring parts 22 and 24 into contact with legs 16 where line 26 intersects parts 22 and 24 is indicated by line 28. Further movement of parts 22 and 24 toward each other will bring about elastic compression of the convoluted central portion of the body as indicated by line 30 extending upwardly from the right end of line 28 at a substantially steeper angle than line 28.

At this point, it will be seen that the ring arrangement according to the present invention provides for a dual spring rate over a certain initial range of axial compression of the ring. At the upper end of line 30, some axial region of the ring is stressed to beyond the elastic limit thereof and is, thus, permanently deformed and also commences to work harden. This portion might be the central peak of convolution 12, for example.

With the central portion of the body of the ring now compressed to the degree that a portion thereof is stressed to beyond the elastic limit, further axial compression of the ring will take place at a substantially constant load as indicated by the substantially horizontal line 32 extending rightwardly from the upper end of line 30.

It will be appreciated at this point that, once the elastic compression of the ring has been accomplished, further axial compression thereof will take place at a substantially constant load. It will also be apparent that releasing of the load from the ring will bring about a first elastic expansion thereof up to the point that parts 22 and 24 separate from the body part of the ring with further elastic expansion of the ring taking place as the compression which caused the inward flexing of radial flanges 20 is eliminated.

Thus, if a ring has been caused to undergo plastic deformation from point A on line 32 to point B thereof, releasing of the load on the ring will cause it to expand slong line 32, followed by expansion thereof along line 34. It will be noted that lines 34 and 36 are substantially parallel to lines 30 and 28 respectively, so that the dual spring rate of the element according to the present invention is maintained.

Compressing the ring again in the axial direction following the aforementioned release thereof will cause the ring to compress again substantially along lines 36 and 34 back to line 32, whereupon the constant load compressibility of the ring again is restored. The ring can be compressed and released repeatedly and each time that the ring is compressed along line 32, the return line when it is released will remain parallel to lines 28 and 30 but displaced rightwardly on the graph.

The load-deflection characteristic of the ring will, thus, be maintained substantially constant throughout the axial compression of the element until the convolutions of the element commence to collapse on each other. The element thus provides a dual elastic spring rate which will permit reliable preloading of an element without laborious fitting and without extremely close machining tolerances.

It has been mentioned that the respective convolutions may be concave toward the outside or inside of the element, although the convolutions in any case will alternate with regard to the direction of concavity.

The dual rate spring element of the present invention is particularly advantageous in respect of loading ball bearings and the like. Such bearings can be preloaded at relatively low force levels with considerable accuracy without observing close machining tolerances of the parts employed in the assembly, and without laborious fitting thereof.

In making up such an assembly, the load element may be installed against a bearing race and precompressed to adjust the free axial length thereof and then released and, upon securing the ring in place with a retainer, the desired preload on the bearing race will be obtained.

As a particular example, a ring according to the invention which may have a free axial heighth of one-fourth inch may compress along line 28, and along the other compression lines parallel thereto, in an amount of about 0.005 inches. Depending upon the leverage distance from the peaks of convolutions 14 to the location of the shoulders defined at the junctures of radial flanges 20 and axial offsets 18, and the thickness of the material and the particular material used, the amount of axial compression of the ring as represented by 30, and the other lines parallel thereto, may be as much as 0.010 inches, or more.

The slope of line 28 is not precisely uniform, but is nearly enough so for application engineering purposes. The spring rate along line 30, represented by the slope thereof, and those lines parallel thereto is, however, substantially linear.

In general, the spring rate along line 28 is selected to be not more than about one-fourth of the spring rate along line 30, which permits the development of accurate preload with not more than ordinary manufacturing tolerances in the parts of the assembly in which the element is embodied.

It is important to note that the ring may be used without any stress relief whatsoever as in the case of 304 stainless steel. Heat treatment generally may be applied only in the case of the more ductile heat treatable materials as Inconel X or A-286. Stress relief is not employed even for these materials. Annealing is always done prior to forming the strip.

A ring having the same configuration as described is useful as a dual rate spring without the feature of constant force compressibility of the ability to be adjusted for assembly tolerance variations. Such springs could be made from a wide variety of materials including metals having little or no ductility and would, of course, require intermediate annealling during manufacture.

The slope of line 28 of FIG. 6 depends on the dimensions of the shoulders, while the slope of line 30 depends on the distance from the contact points of line 26 with parts 22 and 24 of FIG. 3 and the convolution at 14 of FIG. 2 which, in turn, is dependent on the radial width of the convolutions from 12 to 14 of FIG. 2. The slope of line 30 is also dependent on the yield stress of the material and metal thickness which also affects slope. Generally, the abcissa distance of 28 will be about 0.005 inches or more and for line 30 will be about 0.005 inches for a ¼ inch high ring. By increasing the leverage distance of offsets 18, the line segment 28 will be increased in lenght and reduced in slope.

Figure 7:
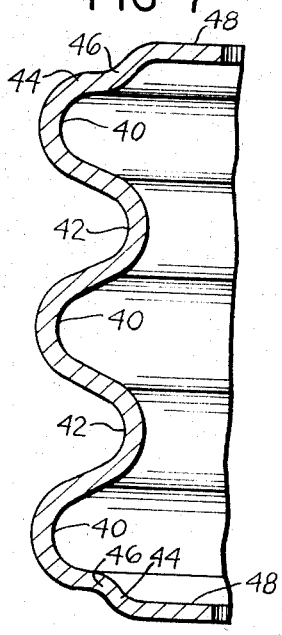
FIG. 7 is a section through another ring according to the present invention.

FIG. 7 is a scale drawing of a modified arrangement wherein the ring has three convolutions 40 concave in one direction, and two convolutions 42 concave in the opposite direction. The outer ends of the outermost convolutions are substantially radial, as indicated at 44 and merge with the axially inner ends of shoulders 46, the outer ends of which merge with radial leg portions 48.

Any of the rings shown and described could have the outer convolutions concave inwardly or outwardly and the same characteristics for the ring would be had.

Modifications may be made within the scope of the appended claims.

What is claimed is:

1. In a dual rate spring or load element; a relatively thin strip of resilient metal formed substantially to a single layer ring, said strip of metal comprising axially distributed and axially aligned annular convolutions forming the body portion of said ring, annular substantially radial leg portions extending from the axially outermost sides of the end ones of the convolutions of said body portion, each said leg portion between the ends thereof being offset axially outwardly to form thereon an annular axially outwardly projecting shoulder, said shoulders being in axial alignment and disposed in radially spaced relation to an axial median plane passing through said convolutions, said shoulders being located radially between the extreme ends of said leg portions and said median plane, whereby initial axial compression of said ring between confining members having planar surfaces engaging the said leg portions will cause the leg members to flex axially inwardly at a first and lower spring rate until the surfaces of the confining members engage the ends of the axial outermost convolutions of said body portion whereupon further axial compression of said ring by the confining members will result in axial compression of said body portion at a second and higher spring rate, the axial height of said shoulders being selected such that the said flexing of said radial legs during said initial axial compression of said ring is in the form of purely elastic deformation.

2. A spring element according to claim 1 in which the axial compression of said body portion of said ring during said further axial compression thereof is in the form of a first period of elastic deformation of said body portion followed by a second period of plastic deformation thereof.

3. A spring element according to claim 2 in which the metal from which said strip is formed in ductile and work hardenable whereby the compressive force on said ring remains substantially constant during said second period of plastic deformation of said body portion.

4. A spring element according to claim 3 in which said ring is substantially stress free in initial non-compressed condition.

* * * * *